US007640010B2

(12) United States Patent
Muhonen

(10) Patent No.: US 7,640,010 B2
(45) Date of Patent: Dec. 29, 2009

(54) METHOD AND APPARATUS FOR SELECTING SYSTEMS, MODE, AND FUNCTION IN AN ADAPTIVE TERMINAL

(75) Inventor: Ahti Muhonen, Hirvihaara (FI)

(73) Assignee: Nokia Corporation, Espoo (FI)

( * ) Notice: Subject to any disclaimer, the term of this patent is extended or adjusted under 35 U.S.C. 154(b) by 961 days.

(21) Appl. No.: 09/836,792

(22) Filed: Apr. 17, 2001

(65) Prior Publication Data

US 2002/0151298 A1   Oct. 17, 2002

(51) Int. Cl.
*H04M 3/00* (2006.01)
(52) U.S. Cl. .................. 455/418; 455/419; 455/420
(58) Field of Classification Search ............. 455/550.1, 455/418, 419, 420, 512.1, 553.1, 403, 552.1, 455/168.1
See application file for complete search history.

(56) References Cited

U.S. PATENT DOCUMENTS 5,603,084 A * 2/1997 Henry et al. ................ 455/419
5,761,621 A * 6/1998 Sainton ...................... 455/453
6,009,325 A * 12/1999 Retzer et al. ................ 455/434
6,014,705 A   1/2000 Koenck et al. .............. 709/230
6,169,733 B1  1/2001 Lee ........................... 370/342
6,181,734 B1  1/2001 Palermo ..................... 375/219
6,181,936 B1* 1/2001 Jonsson et al. ............. 455/433
6,493,540 B1* 12/2002 Suzuki ...................... 455/67.11
6,546,246 B1* 4/2003 Bridges et al. ............. 455/432.1
6,591,116 B1* 7/2003 Laurila et al. .............. 455/558

FOREIGN PATENT DOCUMENTS

DE   198 18 515 A1   4/1999
GB   2 294 844 A     8/1996

OTHER PUBLICATIONS

"The Spectrum Ware Approach to Wireless Signal Processing", Tennenhouse D L et al., Wireless Networks, ACM, US, vol. 2, No. 1, Mar. 1, 1996, pp. 1-12.

* cited by examiner

*Primary Examiner*—Jean A Gelin
(74) *Attorney, Agent, or Firm*—Perman & Green LLP

(57) ABSTRACT

A mobile station, having software radio architecture of the type that provides the capability of global usage, is provided with a system for selecting among the modes, features and services available in the mobile station and supported within a particular cellular communications network.

10 Claims, 5 Drawing Sheets

| RADIO MODES | WCDMA | TD/CDMA | CDMA2000 | WLAN |
|---|---|---|---|---|
| SIM/TERMINAL /PREFERENCES/CAPABILITIES | | | | |
| Supported Radio Modes | Yes | No | No | Yes |
| Supported Frequencies | 1900 MHz - 2400MHz | | | |
| Operational Preferences | First | Second | Not Available | Not Available |
| NETWORK/OPERATOR CAPABILITIES/PREFERENCES | | | | |
| Load | Light | Medium | Medium | Heavy |
| Supported QoS | All | Best Effort | All | Best Efforts |
| Supported Messaging | SMS | MMS | MMS | MMS |
| Video | Available | Not Available | Available | |
| USER CAPABILITIES/PREFERENCES | | | | |
| Priority of Radio Modes | Primary | Low | Low | Secondary |
| Priority of Operators | Vodafone | Sprint/ AT&T | Sprint/ AT&T/ Vodafone | Sprint/ AT&T |

FIGURE 5

METHOD AND APPARATUS FOR SELECTING SYSTEMS, MODE, AND FUNCTION IN AN ADAPTIVE TERMINAL

BACKGROUND OF THE INVENTION

More and more of the functions of a digital cellular system are being implemented in software resident within the memory of the mobile station. This change has been accelerated by the increased processing and storage capacity of microprocessors. To take advantage of this technology the mobile station is rapidly becoming an adaptive terminal which allows certain of its functions to be reprogrammed for operation in a wide variety of modes and systems. This will eventually lead to universal global operation for cellular telephones having this adaptive capability.

Mobile stations of this type will employ a combination of techniques that include multi-band antennas and RF conversion; wideband analog/digital and digital/analog conversion and the implementation of intermediate frequency, baseband and bitstream processing functions in general purpose programmable processors within the mobile station. Such adaptive terminals are now being referred to as a "software radio" and this technology is receiving focused development attention, as the functionality of mobile cellular stations expands. (see "Software Radio Technology Challenges and Opportunities", First European Workshop on Software Radios, 29 May 1997, Joseph Mitola III).

Software radio architectures have emerged, such as the systems described in U.S. Pat. No. 6,185,418 (Feb. 6, 2001); U.S. Pat. No. 6,181,734 (Jan. 30, 2001); U.S. Pat. No. 6,014,705 (Jan. 11, 2000); and U.S. Pat. No. 6,169,733 (Jan. 2, 2001). A reconfigurable adaptive digital radio is described in the '418. In this system the communications processing algorithms can be modified to provide a flexible communications system. In the system of the '734 patent all processing of information for the reception and transmission of signals is performed in software. The software for specific waveforms is stored or adaptively programmed into the mobile station. The '705 patent describes a system architecture which supports the function of a software radio. The mobile station of the '733 patent shows an architecture that allows operation on a multi-mode basis. The content of these patents are incorporated herein by reference.

Since as early as 1995 related groups have been working on standards which would establish a universal mobile telecommunications system (UMTS). One of there priorities is to establish a common global language by which a local base system and a mobile station can establish the existence and use the capability of software radio architecture. (See, "Software Radio: The Standards Perspective", Bill Robinson, Motorola Corporation).

As the "software radio" is implemented, the mobile station will be faced with the need to adapt its function to the modes and functions available in a particular locality. It is a purpose of this invention to provide a system in the signal processor and main controller of a mobile station for selecting from the various modes and functions available. It is also a function of this invention to provide an adaptive matrix which combines the available modes and functions of the mobile station and the local cellular systems.

SUMMARY OF THE INVENTION

In accordance with this invention, a mobile station, having software radio architecture of the type that provides the capability of global usage, is provided with a system for selecting among the modes, features and services available in the mobile station and supported within a particular cellular communications network. The network data may be received by querying the Common System parameter Channel. Language consistent with Universal Mobile Telecommunication Standards are employed to collect and compile network characteristic data within the memory of the mobile station. These data are combined with the universal subscriber data and service data resident in the mobile station to generate a matrix of available configuration parameters. From this data a configuration is selected for operation of the mobile station within the network.

DESCRIPTION OF THE DRAWING

The subject invention is described in more detail below with reference to the drawing in which:

FIG. 5 is a table showing the information in an illustrative example of a matrix of this invention.

DETAILED DESCRIPTION OF THE INVENTION

Figure 1:
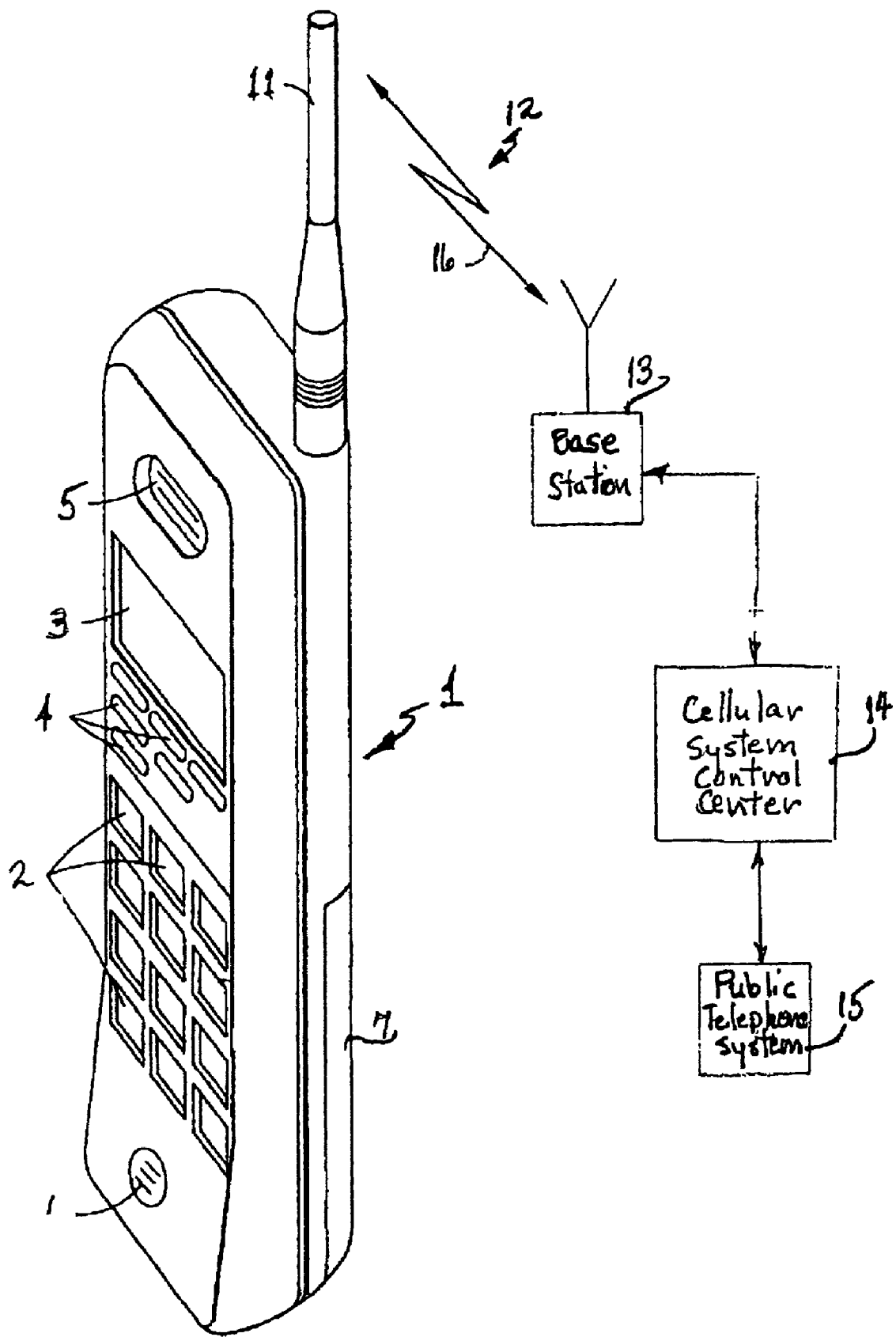
FIG. 1 is a schematic illustration of a cellular communication system.

As shown in FIG. 1, the mobile station 1 includes a user interface which consists of a keyboard 2, display 3, control buttons 4, speaker 5 and microphone 6. The mobile station 1 is powered by a battery pack 7. The user interface is used to input and receive data, voice, and text communications processed through a master controller 8.

The mobile station 1 is equipped with a transmitter 9 and receiver 10 to send and receive data via antenna 11 over a broadband channel 12 to a base station 13. Base station 13 is connected to system control center 14 which connects to the local landline based telephone system 15. Base station 13 sends data over broad band channel 12 which includes a Common System Parameter Channel 16. This channel sends data constructed in accordance with Universal Mobile Telecommunication System (UMTS) Standards. This data includes: radio band; access mode; service type; QoS, current load, available system features and other system parameters.

Figure 2:
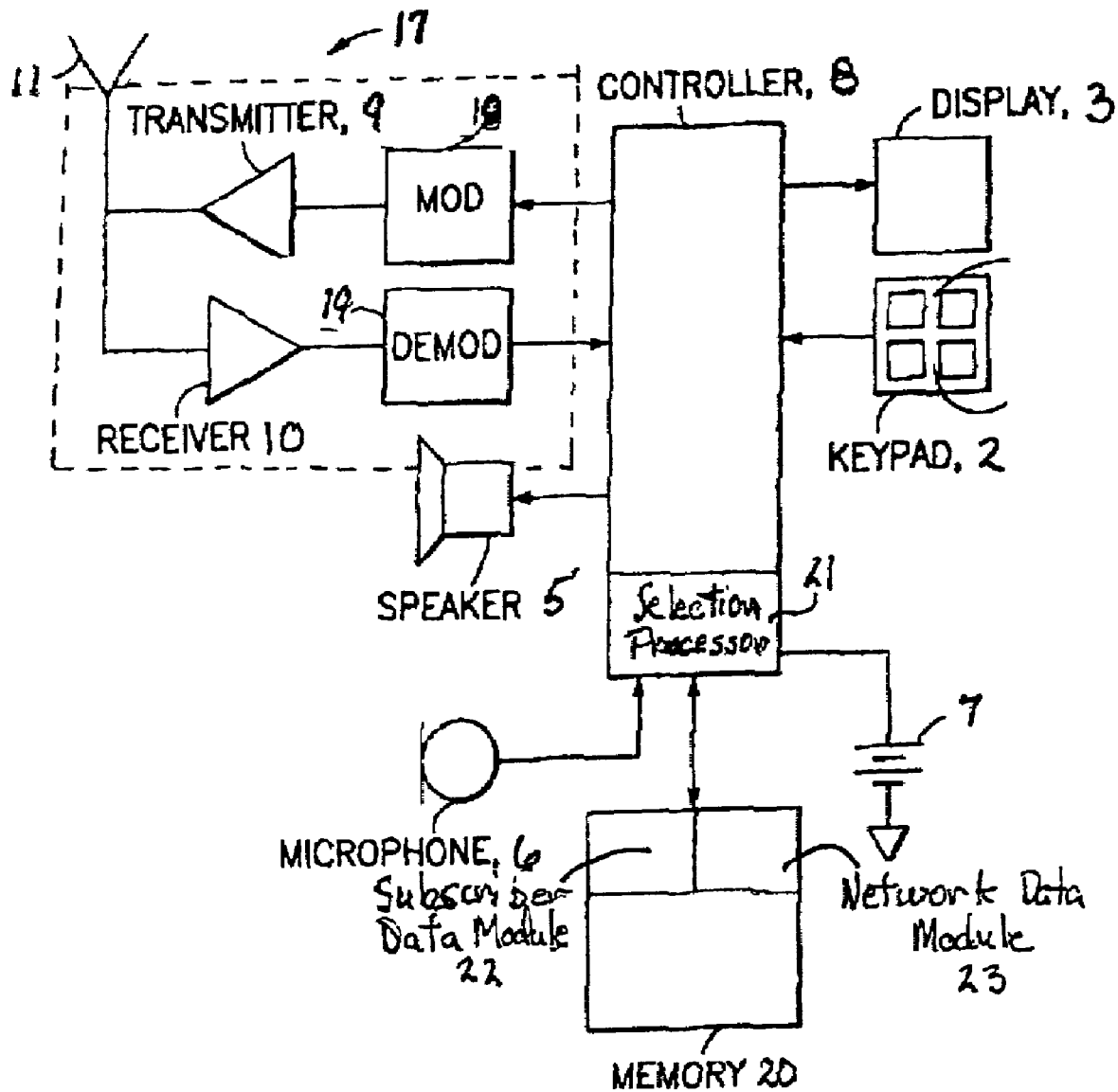
FIG. 2 is a schematic diagram of a mobile station having the system of this invention.

The architecture of a typical mobile station for use in a cellular communications network is shown in the schematic diagram of FIG. 2. A transceiver module 17 includes transmitter 9 and receiver 10, connected to modulator 18 and demodulator 19 respectively. Controller 8 may be constructed in a single microprocessor chip or a series of microprocessor components according to a specific design. Controller 8 is the main processor which controls all of the functions of the mobile station 1 and is operably connected to a memory 20.

The mobile station architecture of FIG. 2 is only shown in a general sense. Appropriate architecture, designed to accommodate the adaptive operation of a software radio is necessary and may be according to any of the systems described in the patents referenced in the background.

Figure 3:
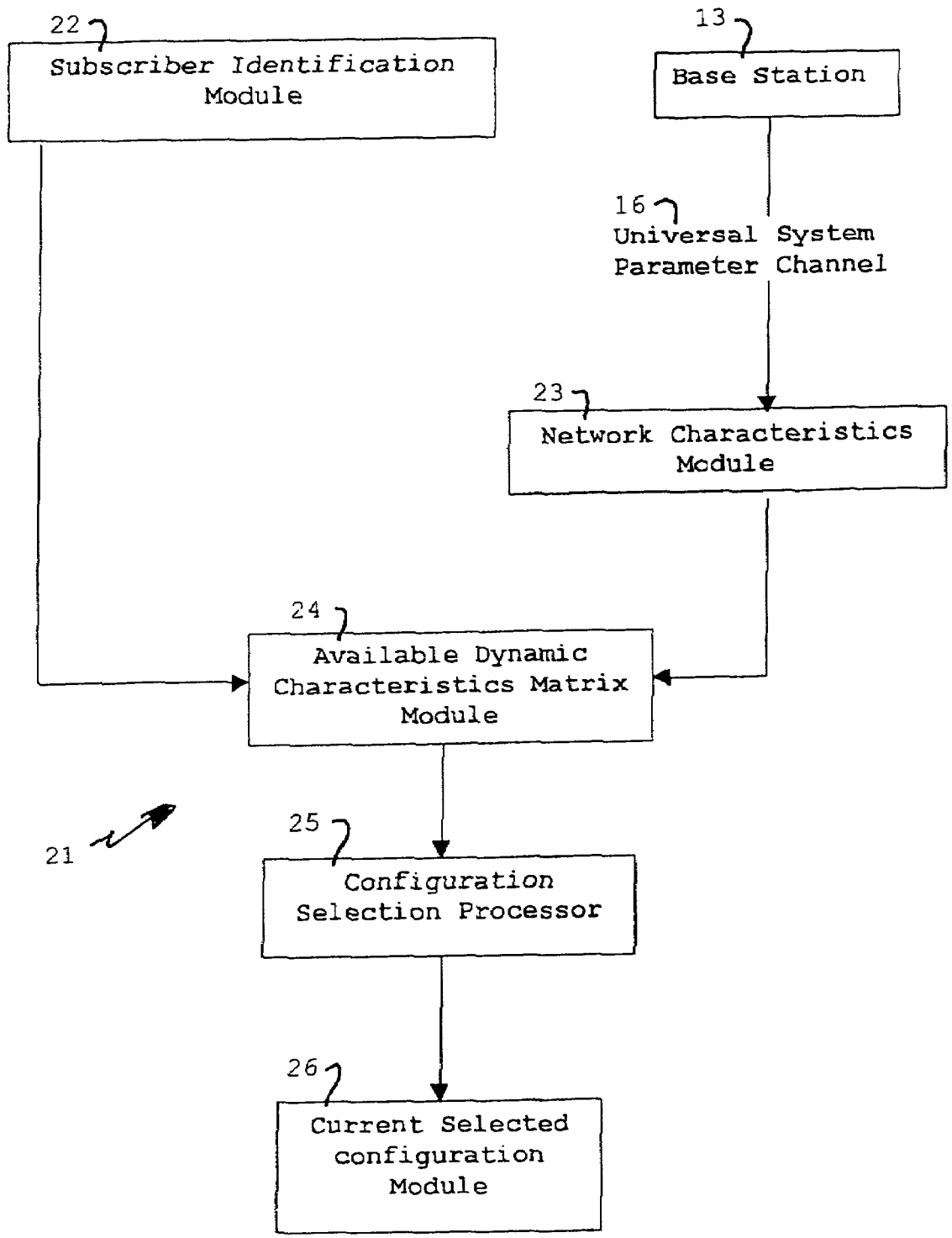
FIG. 3 is a block diagram illustrating the microprocessor module of this invention.
Figure 4:
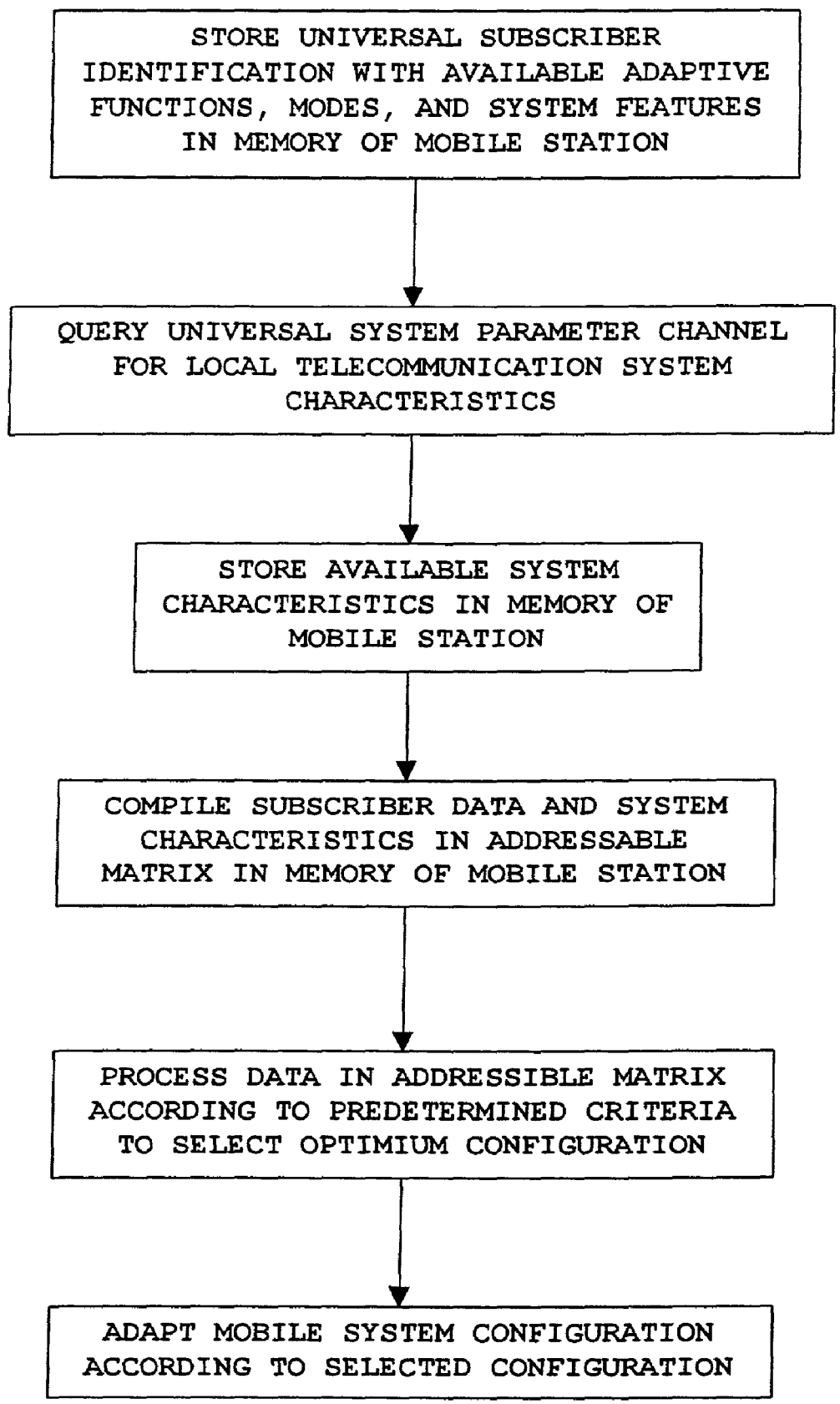
FIG. 4 is a block diagram illustration the steps of the method of this invention.

The system 21 provides for selection of an appropriate configuration amongst the available options present in a universal mobile telecommunication system is shown in FIG. 3. The system 21 includes a subscriber identification module 22 which may be a combination of a read only memory unit (ROM) and a programmable memory (PROM). The ROM is programmed by the manufacturer of the mobile station with the basic features and capabilities provided by the manufacturer. The PROM would contain data programmed, after purchase, by a particular cellular phone service at the time of activation. This data would be structured to be compatible with appropriate UMTS standard. The subscriber identification module 22 would contain such data as subscriber identification, security parameters, allowed systems, supported features, and other supported services.

A network characteristic module 23 is connected to receive and store network parameters available in the local cellular network. The module 23 consists of a memory unit which is erasable and programmable, for example an EPROM. This would allow module 23 to collect and store the network data available from network to network on the universal system parameter channel. A matrix of available dynamic characteristics is compiled in an addressable processor 24 from the information stored in the memory modules 22 and 23. The available data in the matrix may be as shown in FIG. 5 and such data is processed according to predetermined criteria which may be set by the user, depending upon the particular priority of applications needed. This may be accomplished by a dedicated selection processor 25 which selects the system configuration for use in a particular cellular network. The selection processor 25 will then set the configuration and store it in a memory module 26 for reference by controller 8.

In operation the system of this invention will store user identification, feature capabilities and additional operational characteristics of the design of the mobile station in subscriber identification module 22. This information will be entered by the manufacturer of the mobile station 1 prior to delivery to the user. Further information and capabilities will be programmed by the particular service purchased by the user. Such information will also be stored in the subscriber identification module 22. As the mobile station travels globally it queries information transmitted by the local network on the universal system parameter channel and compiles the information received into a matrix, an example of which is shown in FIG. 5, arranged for use by a processor 25 which may select the most desirable configuration by applying predetermined criteria. The criteria may be set by the user and could include cost, speed, volume of data, and other factors. Once the selection is made the configuration is set for use in the operation of the mobile phone using capabilities mutually supported by the cellular network and the mobile station.

In the most basic selection, the available networks are surveyed and the mode currently programmed would generally be suitable when there is no requirements from the user/application, i.e, when only incoming and outgoing traffic need be considered. If there is a requirement, for example for videocall, the network would be surveyed for QoS/bearer to determine if a particular network will support the application.

It should be understood that the above description of the functional modules as separate elements is for convenience of illustration and such elements may comprise software algorithms stored in memory and executed by a general purpose microprocessor or by application specific processor chips without altering the scope or structure of the invention.

In this manner a system for selection is provided to facilitate the operation of a mobile station having a software radio capability which allows a global operation.

I claim:

1. A mobile station, configured for use as a software radio having the capability for universal adaptive use within independent, globally dispersed cellular communication networks, comprising:
    a transceiver for receiving data over a common system parameter channel from a local one of said independent, globally dispersed networks into which the mobile stations has traveled, wherein said data is received directly without reliance on any local area network or wireline system;
    a first processor for compiling and storing network characteristic data relating to said local one of said independent, globally dispersed cellular communication networks, received over said common system parameter channel, relating to operational capabilities of said cellular networks;
    a second processor for compiling and storing subscriber identification data relating to operational capabilities of said mobile station;
    a third processor for combining said network characteristic data and said subscriber identification data into an addressable matrix of operational capabilities; wherein said third processor further generates an operational configuration based on said matrix and predetermined criteria.

2. A mobile station, according to claim 1, wherein said mobile station further comprises a main microprocessor controller and said first, second, and third processors are modules within said main microprocessor controller.

3. A mobile station, according to claim 1, wherein a portion of said operational characteristics of said mobile station are programmed into said second processor at the time of manufacture.

4. A mobile station, according to claim 1, wherein a portion of said operational capabilities of said mobile station are programmed into said second processor at the time of activation with a home cellular service.

5. A mobile station, according to claim 3, wherein said second processor further comprises a read only memory unit for storing said operational capabilities of the mobile station entered at the time of manufacture.

6. A mobile station, according to claim 4, wherein said second processor further comprises a programmable read only memory unit for storing said operational capabilities of the mobile station entered at the time of activation.

7. A mobile station, according to claim 1, wherein said first processor comprises an erasable, programmable read only memory.

8. A method for use in a mobile station, according to claim 1, wherein the predetermined criteria comprise at least one of cost, speed, and volume of data.

9. A method for use in a mobile station, configured for use as a software radio having the capability for universal adaptive use within independent, globally dispersed cellular communication networks, said method comprising the steps of:
    receiving data over a common system parameter channel from a local one of said independent, globally dispersed networks, wherein said data is received directly without reliance on any local area network or wireline system;
    compiling and storing network characteristic data relating to said local one of the independent, globally dispersed cellular communication networks, received over said common system parameter channel, relating to the operational capabilities of said cellular networks;
    compiling and storing subscriber identification data relating to the operational capabilities of said mobile station;
    combining said network characteristic data and said subscriber identification data into an addressable matrix of operational capabilities;
    generating an operational configuration based on said matrix and predetermined criteria.

10. A method for use in a mobile station, according to claim 9, wherein the predetermined criteria comprise at least one of cost, speed, and volume of data.

* * * * *